United States Patent
Nguyen et al.

(10) Patent No.: US 10,988,674 B2
(45) Date of Patent: Apr. 27, 2021

(54) CHELATING ETCHING AGENT STIMULATION AND PROPPANT STABILIZATION OF LOW-PERMEABILITY SUBTERRANEAN FORMATIONS

(71) Applicant: Halliburton Energy Services, Inc., Houston, TX (US)

(72) Inventors: Philip D. Nguyen, Houston, TX (US); Ronald G. Dusterhoft, Katy, TX (US); Jessica Lynn Heeter, Houston, TX (US); Aaron M. Beuterbaugh, Spring, TX (US); Enrique A. Reyes, Tomball, TX (US); Christopher R. Parton, Humble, TX (US); Loan K. Vo, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/563,943

(22) PCT Filed: May 1, 2015

(86) PCT No.: PCT/US2015/028727
§ 371 (c)(1),
(2) Date: Oct. 2, 2017

(87) PCT Pub. No.: WO2016/178646
PCT Pub. Date: Nov. 10, 2016

(65) Prior Publication Data
US 2018/0127640 A1  May 10, 2018

(51) Int. Cl.
| | | |
|---|---|---|
| E21B 43/26 | (2006.01) | |
| E21B 43/267 | (2006.01) | |
| C09K 8/68 | (2006.01) | |
| C09K 8/72 | (2006.01) | |
| C09K 8/94 | (2006.01) | |

(Continued)

(52) U.S. Cl.
CPC .............. *C09K 8/68* (2013.01); *C09K 8/70* (2013.01); *C09K 8/703* (2013.01); *C09K 8/72* (2013.01);

(Continued)

(58) Field of Classification Search
None
See application file for complete search history.

(56) References Cited

U.S. PATENT DOCUMENTS

| | | |
|---|---|---|
| 5,171,460 A | 12/1992 | Underdown |
| 6,439,309 B1 | 8/2002 | Matherly et al. |

(Continued)

FOREIGN PATENT DOCUMENTS

| | | |
|---|---|---|
| WO | WO-2012/171858 A1 | 12/2012 |
| WO | WO-2012171857 A1 | 12/2012 |
| WO | WO-2014164835 A1 | 10/2014 |

OTHER PUBLICATIONS

1. Bale, A., Smith, M. B., & Klein, H. H. (Jan. 1, 2010). Stimulation of Carbonates Combining Acid Fracturing With Proppant (CAPF): A Revolutionary Approach for Enhancement of Final Fracture Conductivity and Effective Fracture Half-Length. Society of Petroleum Engineers. doi:10.2118/134307-MS generally describe.*

(Continued)

*Primary Examiner* — Charles R Nold
(74) *Attorney, Agent, or Firm* — McGuireWoods LLP

(57) ABSTRACT

Methods including introducing a first treatment fluid comprising a first aqueous base fluid and a chelating etching agent into a low-permeability subterranean formation comprising carbonate material having a first fracture network at a first treatment interval therein, wherein the first fracture network comprises a first main fracture and a first microfracture. The method further comprises placing the chelating etching agent in the first fracture network and reacting it (Continued)

with the carbonate material in the first fracture network. In certain embodiments, the reacting removes the carbonate material, thereby creating at least one conductive channel on a face of the first fracture network. The method further comprises introducing a second treatment fluid comprising a second aqueous base fluid and micro-sized proppant particulates into the low-permeability subterranean formation and placing the micro-sized proppant particulates into the first fracture network to form a partial monolayer in the first microfracture.

13 Claims, 1 Drawing Sheet

(51) Int. Cl.
    *C09K 8/92* (2006.01)
    *C09K 8/70* (2006.01)
    *C09K 8/80* (2006.01)
    *C09K 8/86* (2006.01)

(52) U.S. Cl.
    CPC ............... *C09K 8/80* (2013.01); *C09K 8/86* (2013.01); *C09K 8/92* (2013.01); *C09K 8/94* (2013.01); *E21B 43/26* (2013.01); *E21B 43/267* (2013.01)

(56) References Cited

U.S. PATENT DOCUMENTS

| | | | |
|---|---|---|---|
| 7,392,847 | B2 | 7/2008 | Gatlin et al. |
| 7,819,192 | B2 | 10/2010 | Weaver et al. |
| 7,956,017 | B2 | 6/2011 | Gatlin et al. |
| 8,316,941 | B2 | 11/2012 | Frenier et al. |
| 2003/0216263 | A1 | 11/2003 | Tibbles et al. |
| 2004/0261995 | A1 | 12/2004 | Nguyen et al. |
| 2009/0038799 | A1 | 2/2009 | Garcia-Lopez de Victoria et al. |
| 2011/0120712 | A1 | 5/2011 | Todd et al. |
| 2012/0097392 | A1 | 4/2012 | Reyes et al. |
| 2013/0284437 | A1 | 10/2013 | Nguyen et al. |
| 2014/0034309 | A1 | 2/2014 | Saini et al. |
| 2014/0318778 | A1* | 10/2014 | Skala ............... E21B 43/267 166/280.1 |

OTHER PUBLICATIONS

Li et al., "Invert Emulsion Acid for Simultaneous Acid and Proppant Fracturing," Offshore Technology Conference, Oct. 2013, OTC 24332, 9 pages.

ISRWO from PCT/US2015/028727, dated Feb. 2, 2016, 12 pages.

* cited by examiner

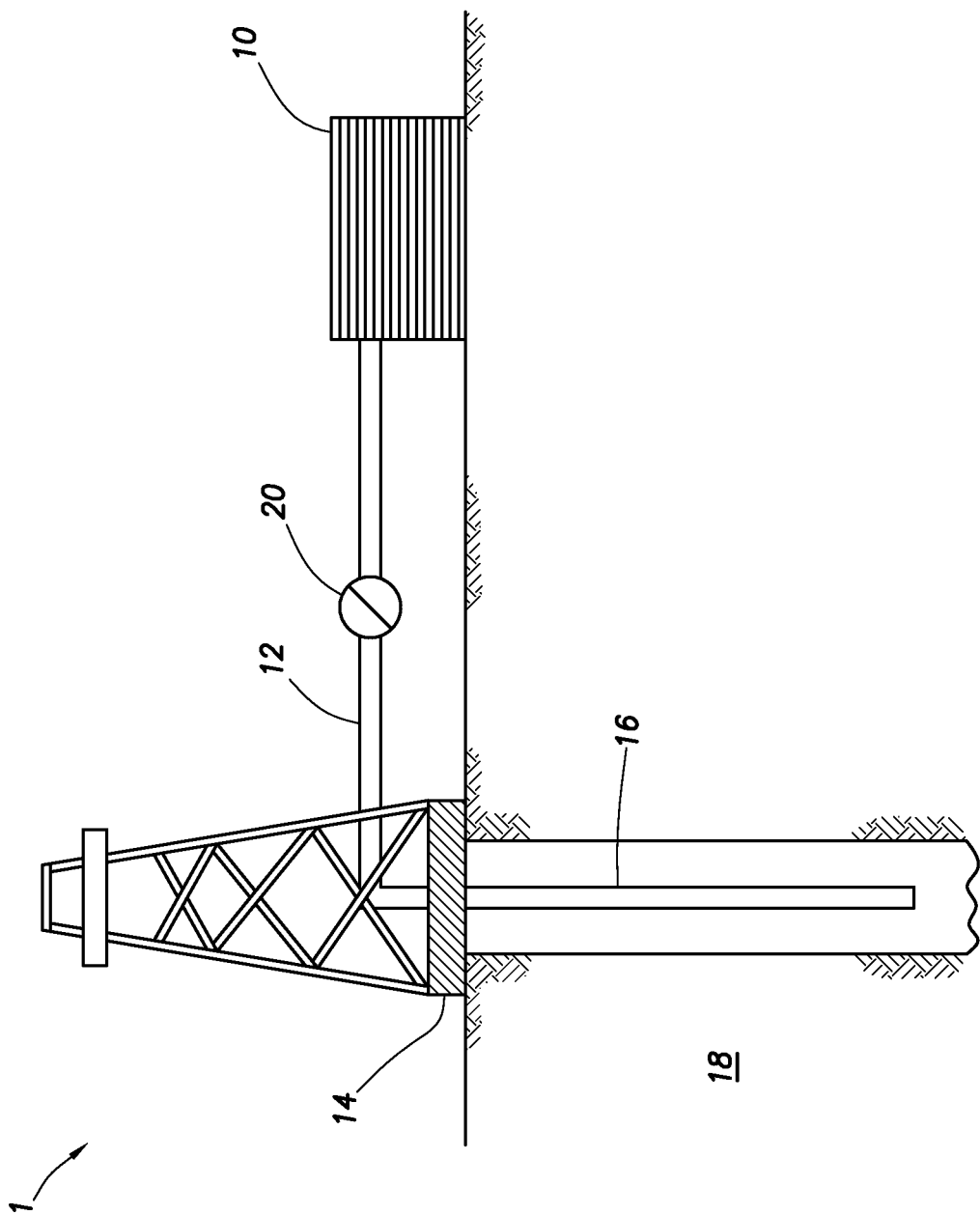

CHELATING ETCHING AGENT STIMULATION AND PROPPANT STABILIZATION OF LOW-PERMEABILITY SUBTERRANEAN FORMATIONS

BACKGROUND

The embodiments herein relate generally to subterranean formation operations and, more particularly, to chelating etching agent stimulation and proppant stabilization of low-permeability subterranean formations.

Hydrocarbon producing wells (e.g., oil producing wells, gas producing wells, and the like) are often stimulated by hydraulic fracturing treatments. In traditional hydraulic fracturing treatments, a treatment fluid, sometimes called a carrier fluid in cases where the treatment fluid carries particulates entrained therein, is pumped into a portion of a subterranean formation (which may also be referred to herein simply as a "formation") above a fracture gradient sufficient to break down the formation and create one or more fractures therein. The term "treatment fluid," as used herein, refers generally to any fluid that may be used in a subterranean application in conjunction with a desired function and/or for a desired purpose. The term "treatment fluid" does not imply any particular action by the fluid or any component thereof. As used herein, the term "fracture gradient" refers to a pressure (e.g., flow rate) necessary to create or enhance at least one fracture in a subterranean formation.

Typically, particulate solids, such as graded sand, are suspended in a portion of the treatment fluid and then deposited into the fractures. The particulate solids, known as "proppant particulates" or simply "proppant" serve to prevent the fractures from fully closing once the hydraulic pressure is removed. By keeping the fractures from fully closing, the proppant particulates form a proppant pack having interstitial spaces that act as conductive paths through which fluids produced from the formation may flow. As used herein, the term "proppant pack" refers to a collection of proppant particulates in a fracture. The degree of success of a stimulation operation depends, at least in part, upon the ability of the proppant pack to permit the flow of fluids through the interconnected interstitial spaces between proppant particulates.

The complexity of the fracture network (or "network complexity") may be enhanced by stimulation operations to create new or enhance (e.g., elongate or widen) existing fractures. As used herein, the term "fracture network" refers to the access conduits, man-made or otherwise, within a subterranean formation that are in fluid communication with a wellbore. One such stimulation involves the introduction of an acid alone or in a carrier fluid into a subterranean formation such that the acid contacts the subterranean formation or a desired portion of a subterranean formation (e.g., a fracture or portion of a fracture). The acid reacts with acid soluble materials contained in the subterranean formation, such as carbonate materials, thereby etching channels into the subterranean formation and increasing the permeability thereof. Such acid treatments may be combined with fracturing stimulation operations, termed "fracture-acidizing," which involves fracturing a subterranean formation using an acid alone or in a carrier fluid such that the acid etches channels in the subterranean formation, including the formed or enhanced fractures created during the treatment, thereby creating flow-paths for the production of hydrocarbons.

BRIEF DESCRIPTION OF THE DRAWINGS

The following FIGURE is included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering various fluids of the embodiments described herein to a downhole location.

DETAILED DESCRIPTION

The embodiments herein relate generally to subterranean formation operations and, more particularly, to chelating etching agent stimulation and proppant stabilization of low-permeability subterranean formations.

Specifically, the embodiments of the present disclosure employ a combination of a chelating etching agent and micro-sized proppant particulates to synergistically enhance fracture network complexity, particularly in low-permeability subterranean formations comprising carbonate material. As used herein, the term "low-permeability formation" refers to a formation that has a matrix permeability of less than 1,000 microDarcy (equivalent to 1 milliDarcy). As used herein, the term "low-permeability formation" encompasses "ultra-low permeability formations," which refers to a formation that has a matrix permeability of less than 1 microdarcy (equivalent to 0.001 millidarcy). Increasing fracture network complexity (e.g., keeping fractures, such as microfractures as described below, opened) greatly increases the surface area for the hydrocarbons (gas and/or oil) to desorb from the low-permeability formation matrix (e.g., shale formation matrix), providing flow paths for these fluids to communicate with connected fractures (e.g., primary fractures or their smaller branches (e.g., microfractures)) and the wellbore for enhancing well production.

The chelating etching agents described herein are particularly selective at reacting with and solubilizing (also referred to simply as "removing" herein) acid-soluble carbonate materials that are particularly prominent in low-permeability formations, including shale formations. For example, the chelating etching agents described herein may be particularly effective at reacting with and removing carbonate materials such as calcite, calcium carbonate, and the like. Specifically, such carbonate materials are naturally embedded within subterranean formations and may be so located in patches, interconnected networks, river-like geometries, and the like. That is, the carbonate material may be non-uniformly displaced throughout the formation. Upon contact with the chelating etching agents described herein, the carbonate material solubilizes or removes a substantial portion of the carbonate material, thereby leaving etches or voids in the formation rock where the carbonate material once was. These etches may be in any shape or size and contribute to the formation of a conductive channel through which produced fluids may flow. As used herein, the term "conductive channel" refers to an opening of any size or shape (e.g., cracks, slots, channels, perforations, holes, wormholes, or any other ablation) formed from etching a subterranean formation by removing carbonate material therefrom with a chelating etching agent, where such opening allows fluids to flow from the subterranean formation and into a wellbore either directly or through other such conductive channels or fractures, as described herein.

During fracture-acidizing treatment operations, the chelating etching agents described herein are introduced into a formation at a rate and pressure sufficient to create or enhance a fracture in a formation, where the chelating etching agents may then etch conductive channels on a fracture face during the fracture-acidizing treatment operations. Without limitation, the chelating etching agents described herein may etch conductive channels on fracture faces that are naturally present within a formation or have been formed previously through other stimulation techniques, without departing from the scope of the present disclosure. Moreover, the chelating etching agents described herein may additionally be used in re-fracturing operations, without departing from the scope of the present disclosure.

The micro-sized proppant particulates synergistically operate with the chelating etching agents described herein to enhance the conductivity of a fracture network within a low-permeability formation. For example, the micro-sized proppant may be able to enter the near field and far field regions or microfractures within a complex fracture network, while larger, macro-sized proppant, is placed in larger main branch fractures of the complex fracture network. As used herein, the term "far-field region" refers to a portion of a fracture network surrounding and beyond a main fracture tip, whereas the near field region refers to the fracture network located near the wellbore. Additionally, the micro-sized proppant may be readily available and at a low cost, thereby decreasing the economic impact of certain operations on wellbore operators.

Accordingly, the embodiments described herein employ a chelating etching agent and at least micro-sized proppant particulates placed in microfractures to enhance the conductivity of a low-permeability subterranean formation. In other embodiments, macro-sized proppant particulates are also employed and placed into main fractures. As used herein, the term "main fracture," refers to a primary fracture extending from a wellbore. A "microfracture," as used herein, refers to a fracture extending from a main fracture or a secondary fracture extending from a main fracture.

In some embodiments, the main fracture may generally have a length in the range of from a lower limit of about 3 meters ("m"), 18 m, 33 m, 48 m, 63 m, 78 m, 93 m, 108 m, 123 m, 138 m, and 153 m to an upper limit of about 300 m, 285 m, 270 m, 255 m, 240 m, 225 m, 210 m, 195 m, 180 m, 165 m, and 150 m (equivalent to about 10 feet to about 1000 feet), encompassing any value and subset therebetween; and the microfracture may generally have a length in the range of from a lower limit of about 0.3 m, 0.9 m, 1.5 m, 2.1 m, 2.7 m, 3.3 m, 3.9 m, 4.5 m, 5.1 m, 5.7 m, 6.3 m, 6.9 m, and 7.5 to an upper limit of about 15 m, 14.4 m, 13.8 m, 13.2 m, 12.6 m, 12 m, 11.4 m, 10.8 m, 10.2 m, 9.6 m, 9 m, 8.4 m, 7.8 m, and 7.2 m (equivalent to about 1 feet to about 50 feet), encompassing any value and subset therebetween. Accordingly, each of the main fractures and microfractures decrease progressively in length.

Additionally, the microfractures of the present disclosure may, in some embodiments, have a fracture width or flow opening size in the range of from a lower limit of about 1 micrometer ($\mu m$), 5 $\mu m$, 10 $\mu m$, 15 $\mu m$, 20 $\mu m$, 25 $\mu m$, 30 $\mu m$, 35 $\mu m$, 40 $\mu m$, 45 $\mu m$, and $\mu m$ to an upper limit of about 100 $\mu m$, 95 $\mu m$, 90 $\mu m$, 85 $\mu m$, 80 $\mu m$, 75 $\mu m$, 70 $\mu m$, 65 $\mu m$, 60 $\mu m$, 55 $\mu m$, and 50 $\mu m$, encompassing any value and subset therebetween. The fracture width or flow opening size of a main fracture is generally greater than the fracture width or flow opening size of a microfracture. The width of the fractures may be dictated by closures after hydraulic pressure is removed. Like the conductive channels described above, the main fractures and microfractures may be any size and shape (e.g., cracks, slots, channels, perforations, holes, or any other ablation within the formation) that allows fluids to flow from the subterranean formation and into a wellbore, consistent with the descriptions provided herein.

As used herein, unless otherwise stated, the term "fracture" or "fractures" will refer collectively to both main fractures and microfractures.

The embodiments of the present disclosure advantageously stimulate low-permeability formations with a chelating etching agent and micro-sized proppant particulates, thus resulting in increased effective fracture length for produced fluids to flow, retention of longer effective time for produced fluids to flow, reduced re-fracturing or further stimulation operations, reduced water consumption, reduced costs, and the like. That is, the simultaneous chelating etching agent and micro-sized proppant stimulation provides a simple treatment process that, compared to traditional operations, may be more economical, increase hydrocarbon production, increase hydrocarbon production time, produce conductive channels by removing carbonate material, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

In some embodiments, the present disclosure provides a method of stimulating a low-permeability subterranean formation comprising carbonate material using a two-treatment fluid process. The subterranean formation may have therein a first fracture network at a first treatment interval. The first fracture network may be pre-existing (e.g., formed from an earlier fracturing operation, natural, and the like, or a combination thereof) or may be formed by introducing one or both of the treatment fluids into the subterranean formation at a rate and pressure sufficient to create or enhance the fracture network. In some embodiments, the fracture network may be formed by introducing a pad fluid (having a base fluid, such as an aqueous base fluid, and one or more additives, including those discussed herein below) into the subterranean formation at a rate and pressure sufficient to create or enhance the fracture network, without departing from the scope of the present disclosure.

When the chelating etching agent and the micro-sized proppant particulates are included in two treatment fluids, the first treatment fluid may comprise a first aqueous base fluid and a chelating etching agent, and the second treatment fluid may include a second aqueous base fluid and micro-sized proppant particulates. The first treatment fluid may be introduced into the low-permeability subterranean formation comprising the first fracture network at a first treatment interval, wherein the first fracture network comprises a first main fracture and a first microfracture, as described herein. The chelating etching agent may be placed into the first fracture network where the chelating etching agent reacts with the carbonate material in the first fracture network, wherein the reacting removes the carbonate material thereby creating at least one conductive channel on the face of the first fracture network. As used herein, the term "face" of a fracture or a microfracture created in a complex fracture network refers to the surfaces of a formation exposed to the fracturing fluid once a fracture or a microfracture is created. The second treatment fluid may then be introduced into the low-permeability subterranean formation, and the micro-sized proppant particulates placed into the first fracture network to form a partial monolayer in the first microfracture.

As used herein, the term "partial monolayer" refers to a type of proppant pack in which particulates (e.g., the micro-sized particulates) are capable of holding a fracture open, wherein the separation between any one point of the fracture faces may be less than, or about the same, as the largest exterior dimension of any one of the particulates. Accordingly, in some embodiments, only a partial monolayer of the micro-sized proppant particulates is formed in the first microfracture, and the at least partial monolayer serves to maintain open the first microfracture. However, at least a partial multilayer of the micro-sized particulates may also be formed in the first microfracture, serving to maintain open the first microfracture, without departing from the scope of the present disclosure. As used herein, the term "partial multilayer" refers to a type of proppant pack in which particulates (e.g., the micro-sized particulates) are capable of holding a fracture open, wherein the separation between any one point of the fracture faces may be more than the largest exterior dimension of any one of the particulates. In a partial monolayer and/or partial multilayer, the particulates may be spaced closely or widely apart in the fracture.

It will be appreciated that the order of introducing the first and second treatment fluids into the low-permeability subterranean formation is non-limiting. Therefore, the first treatment fluid may be introduced before or after the second treatment fluid is introduced, without departing from the scope of the present disclosure. Additionally, one or more of the steps of introducing the first treatment fluid, placing the chelating etching agent in the first fracture network, reacting the chelating etching agent with the carbonate material, introducing the second treatment fluid, and placing the micro-sized proppant particulates into the first fracture network may be repeated one or more times, in any order, at at least a second fracture network. The second fracture network may be formed by any means previously described, including by diverting fluid to the second fracture network by bridging the first fracture network. Moreover, any number of fracture networks may be created and treated according to the methods described herein, without departing from the scope of the present disclosure. Additionally, the first and second and any combination of any additional fracture networks may be interconnected by one or more of the main fractures and/or the microfractures, such that produced fluid may flow therebetween.

In other embodiments, the chelating etching agent and the micro-sized proppant particulates may be introduced into a low-permeability subterranean formation comprising carbonate material in the same treatment fluid. Such treatment fluid may comprise an aqueous base fluid, the chelating etching agent(s), and micro-sized proppant particulates. In such instances, the treatment fluid comprising both the chelating etching agent and the micro-sized proppant particulates may be introduced into a first treatment interval having a first fracture network thereat in the low-permeability formation. The first fracture network, again, may comprise a first main fracture and a first microfracture. The chelating etching agent may be placed into the first fracture network where the chelating etching agent reacts with the carbonate material therein, thus removing the carbonate material or removing a substantial portion of the carbonate material thereby creating at least one conductive channel on the face of the first fracture network. The micro-sized proppant particulates may be simultaneously placed into the first fracture network to form a partial monolayer in the first microfracture.

In some embodiments, the first fracture network may be pre-existing (e.g., formed from an earlier fracturing operation, natural, and the like, or a combination thereof) or may be formed by introducing the treatment fluid comprising the combined chelating etching agent and micro-sized proppant particulates into the subterranean formation at a rate and pressure sufficient to create or enhance the first fracture network. In other embodiments, the first fracture network may be formed by introducing a pad fluid (having a base fluid, such as an aqueous base fluid, and one more additives, including those discussed herein below) into the subterranean formation at a rate and pressure sufficient to create or enhance the fracture network, without departing from the scope of the present disclosure.

One or more of the steps of introducing the treatment fluid comprising both the chelating etching agent and the micro-sized proppant, placing the chelating etching agent in the first fracture network, reacting the chelating etching agent with the carbonate material, and placing the micro-sized proppant particulates into the first fracture network may be repeated one or more times, in any order, at least a second fracture network. The second fracture network may be formed by any means previously described, including by diverting fluid to the second fracture network by bridging the first fracture network. Moreover, any number of fracture networks may be created and treated according to the methods described herein, without departing from the scope of the present disclosure. Additionally, the first and second and any combination of any additional fracture networks may be interconnected by one or more of the main fractures and/or the microfractures, such that produced fluid may flow therebetween.

Regardless of whether the chelating etching agent and the micro-sized proppant are included in the same or separate treatment fluids, another treatment fluid, comprising an aqueous base fluid and macro-sized proppant particulates, may be introduced after the chelating etching agent and the micro-sized proppant particulates (together or separately). The macro-sized proppant particulates may be placed into the first fracture network (and/or the second or any additional fracture networks) to form a proppant pack in the main fracture therein. The proppant pack formed with the macro-sized proppant particulates in accordance with the methods of the present disclosure differs from the partial monolayer (or multilayer) formed with the micro-sized proppant particulates in that, as described above, the macro-sized proppant particulates are each in contact with one another.

As used herein, the term "treatment fluid" encompasses all of the treatment fluids described herein, including any treatment fluids comprising one or more of an aqueous base fluid, chelating etching agent(s), micro-sized proppant particulates, macro-sized proppant particulates, and any additives. Accordingly, the term "treatment fluid" also encompasses the pad fluids described previously.

In some embodiments, one or more of the treatment fluids described herein may further comprise a surface modification agent. The surface modification agent may be included in any of the treatment fluids to coat the face of fractures in the fracture networks described herein, permitting adherence of one or both of the chelating etching agent, the micro-sized proppant particulates, and/or the macro-sized proppant particulates thereto. As used herein, the term "coating," and all of its variants (e.g., "coat," "coated," and the like) does not imply any particular degree of coating on a particulate; in particular, the term "coating" does not imply 100% coverage. By so adhering, the surface modification agent may enhance the conductivity of the fracture network by facilitating contact of the chelating etching agent to the fracture network for reaction with the carbonate material therein, minimize settling of the micro-sized and/or macro-sized proppant particulates, and increase vertical distribution of solid particulates (e.g., the chelating agent(s), the micro-sized proppant particulates, and the macro-sized proppant particulates), thus ensuring the placement and retention of the proppant in the fracture network and enhancing formation productivity. Additionally, the coated surface modification agent may adhere solubilized (or removed) carbonate material by reaction with the chelating etching agent, such that the carbonate material produces conductive channels in the formation by its removal but can also be used as natural proppant particulates. That is, the carbonate material is removed from the formation, but acts as particulate matter capable of maintaining open the fracture network in the main fracture and/or the microfracture to work synergistically with the macro-sized and micro-sized proppant particulates described herein, thereby enhancing the conductivity of the formation.

The surface modification agent of the present disclosure may also associate with the chelating etching agent in solid form, the micro-sized proppant particulates, the macro-sized proppant particulates, and/or the solubilized carbonate material to form at least a partial coating onto one or more of these solids, in addition to or in lieu of being coated on the face of the fractures. Such coating may achieve the same results as coating the face of the fractures, where the coated solids adhere to the face of the fracture for improved conductivity of the formation during production.

In one embodiment, for example, surface modification agent may be included in the pad fluid for introduction at a rate and pressure sufficient to create or enhance the first fracture network prior to placing the chelating etching agent and the micro-sized proppant particulates (and macro-sized proppant particulates, if applicable) into the low-permeability subterranean formation. The pad fluid may thus comprise an aqueous base fluid and the surface modification agent, wherein introducing the pad fluid coats at least a portion of the face of the first fracture network with the surface modification agent. Thereafter, at least a portion of the chelating etching agent and/or the micro-sized proppant particulates may be adhered to the surface modification agent coated onto the face of the first fracture network. When macro-sized proppant particulates are also introduced into the formation, at least a portion of the macro-sized proppant particulates may adhere to the surface modification agent coated onto the face of the first fracture network in the main fracture thereof. As used herein, the term "at least a portion" with reference to adherence of one or more of the chelating etching agent in solid form, the micro-sized proppant particulates, and/or the macro-sized proppant particulates to the surface modification agent coated onto a face of the fracture network refers to adherence of greater than about 5% of such chelating etching agent in solid form, the micro-sized proppant particulates, and/or the macro-sized proppant particulates introduced into the formation.

In some embodiments, a treatment fluid of the present disclosure may be foamed to deliver the chelating etching agent and/or micro-sized proppant particulates to the first fracture network. The foamed treatment fluid delivery may enhance the amount of chelating etching agent and/or micro-sized proppant particulates that are placed in the first fracture network by minimizing their settling or loss at undesirable locations within the formation during introduction. Additionally, the foamed treatment fluid delivery method may reduce water (e.g., aqueous base fluid) consumption required to perform the operations of the present disclosure, while minimizing potential formation damage.

For example, in some embodiments, where a pad fluid is used to create or enhance the first fracture network, as described herein, and a treatment fluid comprising both the chelating etching agent and the micro-sized proppant particulates are used, the pad fluid may comprise an aqueous base fluid and a gas, and the treatment fluid may comprise an aqueous base fluid, the chelating etching agent, the micro-sized proppant particulates, and a foaming agent. The pad fluid may be first introduced into a low-permeability subterranean formation to create or enhance the first fracture network at a first treatment interval, followed by introduction of the treatment fluid. Within the formation, such as within the first fracture network, the gas in the pad fluid reacts with the foaming agent in the treatment fluid, whereby creating a foamed treatment fluid for delivering the chelating etching agent and micro-sized proppant particulates. The contact between the pad fluid and the treatment fluid, and thus the gas and the foaming agent, may be at or near the first fracture network or at a location in the subterranean formation prior reaching the first fracture network, including any location from the surface to the first fracture network. That is, the treatment fluid may be foamed at or near the first fracture network or prior to reaching the first fracture network, without departing from the scope of the present disclosure.

It will be appreciated that the gas and foaming agent may additionally be included in the same treatment fluid with the chelating etching agent and/or the micro-sized proppant particulates for forming a foamed treatment fluid, without departing from the scope of the present disclosure. Moreover, the treatment fluids comprising macro-sized proppant particulates, or no such particulates or chelating etching agents (e.g., the pad fluid) may further comprise one or both of the gas and/or foaming agent such that such treatment fluid is foamed. The foamed nature of a treatment fluid comprising the macro-sized proppant particulates may provide the necessary carrying capacity for such large particulates without the need for additional suspension additives, although such additives may be included, without departing from the scope of the present disclosure, and may also decrease choking of such macro-sized proppant in the near-wellbore region of the main fracture.

As discussed above, any of the treatment fluids described herein may comprise a surface modification agent, including treatment fluids comprising a gas (e.g., the pad fluid described above) and treatment fluid comprising a foaming agent (e.g., the treatment fluid described above), without departing from the scope of the present disclosure.

The treatment fluids of the present disclosure may comprise an aqueous base fluid. Any suitable aqueous fluid for use in a subterranean formation operation may be used in accordance with the embodiments of the present disclosure. Additionally, where multiple treatment fluids are used to perform an operation described herein (e.g., when the chelating etching agent and the micro-sized proppant particulates are added separately, when macro-sized proppant particulates are introduced, when a pad fluid is introduced, and the like), the aqueous base fluid may be the same or different for any one or all of the treatment fluids used, without departing from the scope of the present disclosure. Suitable aqueous-base fluids may include, but are not limited to, fresh water, saltwater (e.g., water containing one or more salts dissolved therein), brine (e.g., saturated salt water), seawater, and any combination thereof. The aqueous base fluid may additionally be a slickwater aqueous base fluid. As described herein, the term "slickwater" refers to water or a salt solution containing a small amount of friction reducing polymer (e.g., polyacrylamide) which does not significantly enhance viscosity compared to traditional viscosifying agents (e.g., guar). Thus, slickwater has low viscosity, which reduces the energy required in pumping. However, the low viscosity of slickwater increases the difficulty of suspending particulate material, thus often requiring a higher pump rate. But keeping particulate material in suspension becomes much more difficult, thus a higher pump flow rate is often required.

Generally, the water in the aqueous base fluid may be from any source, provided that it does not contain components that might adversely affect the stability and/or performance of the treatment fluids described herein. In certain embodiments, the density of the aqueous base fluid can be adjusted, among other purposes, to provide additional proppant particulate transport and suspension in the treatment fluids. In certain embodiments, the pH of the aqueous base fluid may be adjusted (e.g., by a buffer or other pH adjusting agent), among other purposes, to activate a crosslinking agent and/or to reduce the viscosity of the first treatment fluid (e.g., activate a breaker, deactivate a crosslinking agent). In these embodiments, the pH may be adjusted to a specific level, which may depend on, among other factors, the types of the type of chelating etching agent used, any gas or foaming agent used, any surface modification agents used, and other additives included in the treatment fluid.

The chelating etching agent that may be included in the treatment fluids of the present disclosure in a dispersed state and/or a solid phase. The dispersed state refers to the chelating etching agent that has been emulsified so that the agent can be dispersed in an aqueous base fluid. In a dispersed state, a solid chelating agent may be in its fully protonated or acidic form. The solid phase chelating etching agents may, in some instances, delay the activity of the chelating etching agent until fracture closure, for example, because by being in a solid phase, the activity of the chelating etching agent is concentrated and focused effectively on a location of a surface, and this activity is prolonged. Disaggregating the chelating etching agent due to the closure stress will increase surface area of the chelating etching agent; however, when a surface modification agent is used, as described below, dissolution of the chelating etching agent is delayed or slowed due to a reduction in surface area contacting a fluid, for example.

Suitable chelating etching agents may be any chelating acid capable of solubilizing carbonate material. Such carbonate material may be any carbonate material found in a subterranean formation including, but not limited to, calcium carbonate, magnesium carbonate, barium carbonate, iron(II) carbonate, calcite, calcium magnesium carbonate, calcium ions, and the like, and any combination thereof.

Examples of suitable chelating etching agents may include, but are not limited to, L-glutamic acid N,N,-diacetic acid; a salt of L-glutamic acid N,N,-diacetic acid; methylglycine N,N,-diacetic acid; a salt of methylglycine N,N,-diacetic acid; N-hydroxyethyl ethylenediamine N,N',N'-triacetic acid; a salt of N-hydroxyethyl ethylenediamine N,N', N'-triacetic acid; N-(phosphonomethyl)iminodiacetic acid; a salt of N-(phosphonomethyl)iminodiacetic acid; a phosphonic acid; a salt of phosphonic acid; and any combination thereof. The solubility of these chelating etching agents in the aqueous base fluids may vary and the treatment fluid may be designed to delay such solubility to ensure that the chelating etching agent is not spent prior to reaching the first fracture network (e.g., by selection of certain aqueous base fluids, certain chelating etching agents, and the like), or the operation may be performed to facilitate such delay (e.g., using tubing to introduce the treatment fluid comprising the chelating etching agent at or near the first fracture network such that it does not substantially come into contact with carbonate material until reaching the first fracture network, and the like). For example, the salt chelating etching agents may be more soluble in the aqueous base fluids of the present disclosure than the non-salt chelating etching agents, except for the hydroxy acids which are highly soluble in aqueous base fluids. Additionally, some of the chelating etching agents, such as N-(phosphoneomethyl)iminodiacetic acid, are essentially insoluble in aqueous base fluids.

In some embodiments, the chelating etching agents of the present disclosure may be present in any of the treatment fluids described herein in an amount in the range of from a lower limit of about 0.1 grams per liter (g/L), 0.5 g/L, 1 g/L, 10 g/L, 20 g/L, 30 g/L, 40 g/L, 50 g/L, 60 g/L, 70 g/L, 80 g/L, 90 g/L, 100 g/L, 110 g/L, 120 g/L, 130 g/L, 140 g/L, and 150 g/L to upper limit of about 300 g/L, 290 g/L, 280 g/L, 270 g/L, 260 g/L, 250 g/L, 240 g/L, 230 g/L, 220 g/L, 210 g/L, 200 g/L, 190 g/L, 180 g/L, 170 g/L, 160 g/L, and 150 g/L (equivalent to about 0.001 pounds per gallon (ppg) to about 2.5 ppg) of the aqueous base fluid, encompassing any value and subset therebetween. Each of these values is critical to the embodiments of the present disclosure, and the amount of chelating etching agent may depend on a number of factors including, but not limited to, the type of formation, the type of carbonate material, the type of chelating etching agent, the type of aqueous base fluid, any additional additives, and the like.

The micro-sized proppant particulates and the macro-sized proppant particulates described herein may be any material capable of propping open a fracture after hydraulic pressure is removed. Suitable materials for the micro-sized and macro-sized proppant particulates may include, but are not limited to, sand, bauxite, ceramic material (e.g., ceramic microspheres), glass material, polymeric material (e.g., ethylene-vinyl acetate or composite materials), zeolites, polytetrafluoroethylene material, nut shell pieces, a cured resinous particulate comprising nut shell pieces, seed shell pieces, a cured resinous particulate comprising seed shell pieces, fruit pit pieces, a cured resinous particulate comprising fruit pit pieces, wood, composite particulates, and any combination thereof. Suitable composite particulates may comprise a binder and a filler material, wherein suitable filler materials may include, but are not limited to, silica, alumina, fumed carbon, carbon black, graphite, mica, titanium dioxide, barite, meta-silicate, calcium silicate, kaolin, talc, zirconia, boron, fly ash, hollow glass microspheres, solid glass, and any combination thereof.

In some embodiments, the micro-sized proppant particulates may have an average particle size distribution in the range of from a lower limit of about 0.1 micrometers (μm), 1 μm, 5 μm, 10 μm, 15 μm, 20 μm, 25 μm, 30 μm, 35 μm, 40 μm, 45 μm, 50 μm, 55 μm, 60 μm, 65 μm, 70 μm, and 75 μm to an upper limit of about 150 μm, 145 μm, 140 μm, 135 μm, 130 μm, 125 μm, 120 μm, 115 μm, 110 μm, 105 μm, 100 μm, 95 μm, 90 μm, 85 μm, 80 μm, and 75 μm, encompassing any value and subset therebetween. The micro-sized proppant particulates may be present in any of the treatment fluids of the present disclosure in an amount in the range of from a lower limit of about 1.2 g/L, 5 g/L, 10 g/L, 15 g/L, 20 g/L, 25 g/L, and 30 g/L to an upper limit of about 60 g/L, 55 g/L, 50 g/L, 45 g/L, 40 g/L, 35 g/L, and 30 g/L (equivalent to about 0.01 ppg to about 0.5 ppg) of the aqueous base fluid, encompassing any value and subset therebetween. Each of these values is critical to the embodiments of the present disclosure, and the size and amount of micro-sized proppant particulates may depend on a number of factors including, but not limited to, the type of formation, the type of carbonate material, the type of chelating etching agent, any additional additives, and the like.

The larger, macro-sized proppant particulates may, in some embodiments, have an average particle size distribution in the range of from a lower limit of about 160 μm, 180 μm, 200 μm, 220 μm, 240 μm, 260 μm, 280 μm, 300 μm, 320 μm, 340 μm, 360 μm, 380 μm, 400 μm, 420 μm, 440 μm, 460 μm, 480 μm, 500 μm, 520 μm, 540 μm, 560 μm, and 580 μm to an upper limit of about 1000 μm, 980 μm, 960 μm, 940 μm, 920 μm, 900 μm, 880 μm, 860 μm, 840 μm, 820 μm, 800 μm, 780 μm, 760 μm, 740 μm, 720 μm, 700 μm, 680 μm, 660 μm, 640 μm, 620 μm, 600 μm, and 580 μm, encompassing any value and subset therebetween. The macro-sized proppant particulates may be present in any of the treatment fluids of the present disclosure in an amount in the range of from a lower limit of about 1.2 g/L, 10 g/L, 60 g/L, 120 g/L, 180 g/L, 240 g/L, 300 g/L, 360 g/L, 420 g/L, 480 g/L, 540 g/L, and 600 g/L to an upper limit of about 1200 g/L, 1140 g/L, 1080 g/L, 1020 g/L, 960 g/L, 900 g/L, 840 g/L, 780 g/L, 720 g/L, 660 g/L, and 600 g/L (equivalent to about 0.01 ppg to about 10 ppg) of the aqueous base fluid, encompassing any value and subset therebetween. Each of these values is critical to the embodiments of the present disclosure, and the size and amount of micro-sized proppant particulates may depend on a number of factors including, but not limited to, the type of formation, the type of carbonate material, the type of chelating etching agent, any additional additives, and the like.

The surface modification agent (referred to herein as "SMA") for use in the embodiments described herein may render one or more surfaces (e.g., the face of the at least one fracture, the outer surface of a solid particulate) tacky, such as by forming a coating thereon. As used herein, the term "tacky" in all its forms, refers to a substance that is somewhat sticky to the touch. When the SMA imparts tackiness, it may serve to immobilize the micro-sized and/or macro-sized proppant particulates, solid form chelating etching agents, and/or removed carbonate material solids, and prevent them from migrating out of the fracture networks described herein, thereby enhancing the conductivity of the formation. The SMA may also serve to hinder the tight packing of these solids within the fracture network, resulting in fractures that, after closure, have increased void spaces and, thus, increased permeability and conductivity.

Suitable SMAs for use in the embodiments described herein may be any compound that is capable of imparting the tackifying qualities during a subterranean operation, and may generally be aqueous-based. The SMAs may be liquids or in solution at the temperature of the subterranean formation such that they are, by themselves, nonhardening under reservoir conditions. Suitable examples of compounds for use as SMAs in the methods and compositions described herein include, but are not limited to, a polyamide, a polyester, a polycarbonate, a polycarbamate, a curable resin, a zeta-potential reducing agent, and any combination thereof. In some embodiments, the SMA may be in the form of an aqueous external emulsion.

The polyamides for use as the SMA of the embodiments described herein may be synthetic or natural. The polyamides may be formed, for example, by a condensation reaction product comprising of a polyacid and a polyamine. Such polyamide compounds may include combinations of dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Combinations of these may be suitable as well. The polyamide for use in the embodiments disclosed herein may be a silyl-modified polyamide compound. Such silyl-modified polyamides may be based, for example, on the reaction product of a silylating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water.

In some embodiments, the SMA of may be a polyester. Suitable polyesters may be formed by the reaction of a polyhydric alcohol (e.g., dihydric or higher) and a polybasic acid (e.g., dibasic or higher). Suitable polyhydric alcohols may include, but are not limited to, a glycol; ethylene glycol; diethylene glycol; triethylene glycol; tetraethylene glycol; polyethylene glycol; dipropylene glycol; polypropylene glycol; dibutylene glycol; polybutylene glycol; 1,2-propylene glycol; 1,3-propylene glycol; 1,4-butylene glycol; 2,3-butylene glycol; 1,6-hexanediol; 1,8-octanediol; neopentyl glycol; 1,4-bis-hydroxymethylcyclohexane; 2-methyl-1,3-propanediol; glycerol; trimethylolpropane; 1,2,6-hexanetriol; 1,2,4-butanetriol; trimethylolethane; pentaerythritol; quinitol; mannitol; sorbitol; methylglycoside; and any combination thereof. Suitable polybasic acids may include, but are not limited to, succinic acid; adipic acid; suberic acid; azelaic acid; sebacic acid; phthalic acid, isophthalic acid; trimellitic acid; phthalic anhydride; tetrahydrophthalic anhydride; hexahydrophthalic anhydride; tetrachlorophthalic anhydride; endomethylenetetrahydrophthalic anhydride; glutaric anhydride; maleic acid; maleic anhydride; fumaric acid; a polymeric fatty acid (e.g., oleic acid); and any combination thereof.

The polycarbonates for use as the SMA of the embodiments herein are characterized as having multiple carbonate groups. The polycarbonates may be formed by the reaction product of a polyol and a phosgene. The polyol may be linear or branched and suitable examples may include, but are not limited to, bisphenol A; ethylene glycol; diethylene glycol; triethylene glycol; tetraethylene glycol 1,3-propanediol; 1-4-butanediol; 1,5-pentanediol; 1-6-hexanediol; 1,2-propanediol; 1,2-butanediol; 2,3-butanediol; 1,3-butanediol; 1,2-pentanediol; ethohexadiol; p-menthane-3,8-diol; 2-methyl-2,4-pentanediol; and any combination thereof.

The polycarbamates for use as the SMA of the embodiments herein are derived from carbamic acid, and may include polycarbamate esters. The polycarbamates may be formed by the reaction product of a polyol and carbamic acid. The polyol may be linear or branched and suitable examples may include, but are not limited to, bisphenol A; ethylene glycol; diethylene glycol; triethylene glycol; tetraethylene glycol 1,3-propanediol; 1-4-butanediol; 1,5-pentanediol; 1-6-hexanediol; 1,2-propanediol; 1,2-butanediol; 2,3-butanediol; 1,3-butanediol; 1,2-pentanediol; ethohexadiol; p-menthane-3,8-diol; 2-methyl-2,4-pentanediol; and any combination thereof. Additionally, the reaction may be performed in the presence of a tertiary amine.

In some embodiments, the SMA of the embodiments described herein may be a curable resin. Any curable resin may be used, provided that it is capable of acting as an SMA, as described herein. Some suitable curable resins may include, but are not limited to, a two component epoxy based resins, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resin, a polyester resin hybrid, a polyester resin copolymer, a polyurethane resin, a polyurethane resin hybrid, a polyurethane resin copolymer, an acrylate resin, a silicon-based resin, and any combination thereof. Some suitable curable resins, such as epoxy resins, may be cured with an internal catalyst or activator so that when pumped into the formation, they may be cured using only time and temperature. Other suitable curable resins, such as furan resins generally require a time-delayed catalyst or an external catalyst to help activate the polymerization of the resins if the cure temperature is low (i.e., less than 250° F. (about 121.1° C.)), but will cure under the effect of time and temperature if the formation temperature is above about 250° F. (about 121.1° C.), preferably above about 300° F. (about 148.9° C.). It is within the ability of one skilled in the art, with the benefit of this disclosure, to select a suitable curable resin for use in embodiments described herein and to determine whether a catalyst is required to trigger curing.

In some embodiments, the SMA may be a zeta-potential reducing agent. The zeta-potential reducing agents suitable for use in the embodiments described herein may be formed, for example, by a reaction of an amine and a phosphate ester, such that the zeta-potential reducing agent is capable of altering the zeta potential of a surface.

Suitable amines for use in producing the zeta-potential reducing agents for use as SMAs may include, but are not limited to, any amine that is capable of reacting with a suitable phosphate ester to form a composition that alters the zeta potential of a surface. Suitable examples of such amines may include, but are not limited to, any amine of the general formula $R_1,R_2NH$ or mixtures and combinations thereof, where $R_1$ and $R_2$ are independently a hydrogen atom or a carbyl group having between about 1 and 40 carbon atoms and the required hydrogen atoms to satisfy valence and where one or more of the carbon atoms can be replaced by one or more hetero atoms which may be selected from the group consisting of boron, nitrogen, oxygen, phosphorus, sulfur, and any combination thereof, and where one or more of the hydrogen atoms can be replaced by one or more single valence atoms that may be selected from the group consisting of fluorine, chlorine, bromine, iodine, and any combination thereof.

Suitable examples of amines may include, but are not limited to, aniline and alkyl aniline or mixtures of alkyl aniline, pyridine and alkyl pyridine or mixtures of alkyl pyridine, pyrrole and alkyl pyrrole or mixtures of alkyl pyrrole, piperidine and alkyl piperidine or mixtures of alkyl piperidine, pyrrolidine and alkyl pyrrolidine or mixtures of alkyl pyrrolidine, indole and alkyl indole or mixtures of alkyl indole, imidazole and alkyl imidazole or mixtures of alkyl imidazole, quinoline and alkyl quinoline or mixture of alkyl quinolone, isoquinoline and alkyl isoquinoline or mixture of alkyl isoquinoline, pyrazine and alkyl pyrazine or mixture of alkyl pyrazine, quinoxaline and alkyl quinoxaline or mixture of alkyl quinoxaline, acridine and alkyl acridine or mixture of alkyl acridine, pyrimidine and alkyl pyrimidine or mixture of alkyl pyrimidine, quinazoline and alkyl quinazoline or mixture of alkyl quinazoline, and any combination thereof.

Suitable phosphate esters for use in producing the zeta-potential reducing agents may include, but are not limited to, any phosphate ester that is capable of reacting with a suitable amine to form a composition that alters the zeta potential of a surface. Suitable examples of such phosphate esters may include, but are not limited to, any phosphate esters of the general formula $P(O)(OR^3)(OR^4)(OR^5)$ or mixture and combinations thereof, where $R^3$, $R^4$, and $OR^5$ are independently a hydrogen atom or a carbyl group having between about 1 and 40 carbon atoms and the required hydrogen atoms to satisfy valence and where one or more of the carbon atoms can be replaced by one or more hetero atoms that may be selected from the group consisting of boron, nitrogen, oxygen, phosphorus, sulfur, and any combination thereof, and where one or more of the hydrogen atoms can be replaced by one or more single valence atoms that may be selected from the group consisting of fluorine, chlorine, bromine, iodine, and any combination thereof. Suitable examples of phosphate esters may include, but are not limited to, phosphate ester of alkanols having the general formula $P(O)(OH)_x(OR^6)_y$ where $x+y=3$ and are independently a hydrogen atom or a carbyl group having between about 1 and 40 carbon atoms and the required hydrogen atoms to satisfy valence and where one or more of the carbon atoms can be replaced by one or more hetero atoms that may be selected from the group consisting of boron, nitrogen, oxygen, phosphorus, sulfur, and any combination thereof, and where one or more of the hydrogen atoms can be replaced by one or more single valence atoms that may be selected from the group consisting of fluorine, chlorine, bromine, iodine, and any combination thereof, such as ethoxy phosphate, propoxyl phosphate, higher alkoxy phosphates, and combinations thereof.

Other exemplary examples of phosphate esters may include, but are not limited to, phosphate esters of alkanol amines having the general formula $N[R^7OP(O)(OH)_2]_3$, where $R^7$ is a carbonyl group having between about 1 and 40 carbon atoms and the required hydrogen atoms to satisfy valence and where one or more of the carbon atoms can be replaced by one or more hetero atoms that may be selected from the group consisting of boron, nitrogen, oxygen, phosphorus, sulfur, and any combination thereof, and where one or more of the hydrogen atoms can be replaced by one or more single valence atoms that may be selected from the group consisting of fluorine, chlorine, bromine, iodine, and any combination thereof, including the tri-phosphate ester of tri-ethanol amine, and combinations thereof. Other examples of phosphate esters may include, but are not limited to, phosphate esters of hydroxylated aromatics (e.g., phosphate esters of alkylated phenols such as nonylphenyl phosphate ester or phenolic phosphate esters). Other examples of phosphate esters may include, but are not limited to, phosphate esters of diols and polyols (e.g., phosphate esters of ethylene glycol, propylene glycol, or higher glycolic structures).

An example of suitable commercially available SMA for use in the embodiments described herein may include, but are not limited to, SANDWEDGE® ABC, an aqueous based surface modification agent, available from Halliburton Energy Services, Inc. in Houston, Tex.

In some embodiments, the SMA may be present in the treatment fluids described herein in an amount in the range of from a lower limit of about 0.01% volume/volume (v/v), 0.1% v/v, 0.25% v/v, 0.5% v/v, 0.75% v/v, 1% v/v, 1.25% v/v, 1.5% v/v, 1.75% v/v, 2% v/v, 2.25% v/v, and 2.5% v/v to an upper limit of about 5% v/v, 4.75% v/v, 4.5% v/v, 4.25% v/v, 4% v/v, 3.75% v/v, 3.5% v/v, 3.25% v/v, 3% v/v, 2.75% v/v, and 2.5% v/v of the aqueous base fluid, encompassing any value and subset therebetween. Each of these values is critical to the embodiments of the present disclosure and may depend on, among other things, the type of SMA, the type of subterranean formation, the type of solid particulate (e.g., micro-sized and/or macro-sized proppant particulates, chelating etching agent in solid form, and the like), and the like.

In some embodiments, as described above, one or more of the treatment fluids herein may be foamed. As used herein, the term "foam" refers to a two-phase composition having a continuous liquid phase and a discontinuous gas phase. In some embodiments, the treatment fluids may be foamed by the addition of a gas and a foaming agent, either in the same treatment fluid or in separate treatment fluids as described above.

Suitable gases for use in conjunction with the embodiments of the present disclosure may include, but are not limited to, nitrogen, carbon dioxide, air, methane, helium, argon, and any combination thereof. Each gas may be beneficial in certain subterranean environments. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater particulate transport capability.

In some embodiments, the quality of the foamed treatment fluids may range from a lower limit of about 5%, 10%, 15%, 20%, 25%, 30%, 35%, 40%, 45%, 50%, 55%, 60%, 65%, or 70% gas volume to an upper limit of about 95%, 90%, 85%, 80%, 75%, 70%, 65%, 60%, 55%, or 50% gas volume, encompassing any value and subset therebetween. Each of these values is critical to the embodiments of the present disclosure and may depend on a number of factors including, but not limited to, the type of gas used, the type of foaming agent used, the type of micro- and/or macro-sized proppant particulates, the type of chelating etching agent, and the like.

Suitable foaming agents for use in conjunction with the embodiments of the present disclosure may include, but are not limited to, cationic foaming agents, anionic foaming agents, amphoteric foaming agents, nonionic foaming agents, or any combination thereof. Nonlimiting examples of suitable foaming agents may include, but are not limited to, surfactants like betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, and any combination thereof. Foaming agents may be included at concentrations ranging typically from a lower limit of about 0.05%, 0.1%, 0.2%, 0.3%, 0.4%, 0.5%, 0.6%, 0.7%, 0.8%, 0.9%, and 1% to an upper limit of about 2%, 1.9%, 1.8%, 1.7%, 1.6%, 1.5%, 1.4%, 1.3%, 1.2%, 1.1%, and 1% by weight of the aqueous base fluid (e.g., from about 0.5 to about 20 gallons per 1000 gallons of the aqueous base fluid), encompassing any value and subset therebetween. Each of these values is critical to the embodiments of the present disclosure and may depend on a number of factors including, but not limited to, the type of gas used, the type of foaming agent used, the type of micro- and/or macro-sized proppant particulates, the type of chelating etching agent, and the like.

In some embodiments, the treatment fluids described herein may further comprise a mineral fines stabilizing agent. As used herein, the term "mineral fines stabilizing agent" refers to a chemical substance capable of absorbing on formation surfaces, altering the surface properties of the formation (e.g., clay, silica, carbonate, hematite, magnetite, siderite, and the like), and reducing their interaction with flowing fluids to prevent swelling, dispersion, and/or migration during subterranean formation operations. Accordingly, the carbonate material in the low-permeability subterranean formations described herein may be held in place to increase their probability of contact with the chelating etching agents described herein for solubilization and removal.

Examples of suitable mineral fines stabilizing agents for use in the treatment fluids described herein include, but are not limited to, an acrylic acid polymer, an acrylic acid ester polymer, an acrylic acid derivative polymer, an acrylic acid homopolymer, an acrylic acid ester homopolymer (e.g., poly(methyl acrylate), poly(butyl acrylate), and poly(2-ethylhexyl acrylate)), an acrylic acid ester co-polymer, a methacrylic acid derivative polymer, a methacrylic acid homopolymer, a methacrylic acid ester homopolymer (e.g., poly (methyl methacrylate), poly(butyl methacrylate), and poly (2-ethylhexyl methacrylate)), an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, a bisphenol A diglycidyl ether resin, a butoxymethyl butyl glycidyl ether resin, a bisphenol A-epichlorohydrin resin, a bisphenol F resin, a polyepoxide resin, a novolak resin, a polyester resin, a phenol-aldehyde resin, a urea-aldehyde resin, a furan resin, a urethane resin, a glycidyl ether resin, an epoxide resin, polyacrylamide, partially hydrolyzed polyacrylamide, a copolymer of acrylamide and acrylate, a carboxylate-containing terpolymer, an acrylate tetrapolymer, galactose, mannose, glucoside, glucose, xylose, arabinose, fructose, glucuronic acid, pyranosyl sulfate, guar gum, locust bean gum, tara gum, konjak, tamarind, starch, cellulose, karaya, xanthan, tragacanth, carrageenan, a polycarboxylate (e.g., a polyacrylate, a polymethacrylate, and the like), a methylvinyl ether polymer, polyvinyl alcohol, polyvinylpyrrolidone, and any combination thereof.

Examples of suitable commercially available mineral fines stabilizing agents for use in the embodiments described herein may include, but are not limited to, CLA-WEB®, a stabilizing additive, available from Halliburton Energy Services, Inc. in Houston, Tex.

In some embodiments, the mineral fines stabilizing agent may be present in the treatment fluids described herein in an amount of from a lower limit of about 0.01% v/v, 0.05% v/v, 0.1% v/v, 0.25% v/v, 0.5% v/v, 0.75% v/v, 1% v/v, 1.25% v/v, and 1.5% v/v to an upper limit of about 3% v/v, 2.75% v/v, 2.5% v/v, 2.25% v/v, 2% v/v, 1.75% v/v, and 1.5% v/v of the aqueous base fluid in the treatment fluid, encompassing any value and subset therebetween. Each of these values is critical to the embodiments of the present disclosure and may depend on a number of factors including, but not limited to, the type of formation, the type of carbonate material, the amount of carbonate material in the formation, and the like.

In some embodiments, any of the various treatment fluids of the present disclosure may further comprise an additive for use in performing a particular subterranean formation operation or for use in a particular formation composition. Such additives may include, but are not limited to, a salt, a weighting agent, a fluid loss control agent, an emulsifier, a dispersion aid, a corrosion inhibitor, an emulsion thinner, an emulsion thickener, a viscosifying agent, a gelling agent, a surfactant, a lost circulation material, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

In various embodiments, systems configured for delivering the treatment fluids described herein to a downhole location are described. In various embodiments, the systems can comprise a pump fluidly coupled to a tubular, the tubular containing the treatment fluids described herein. It will be appreciated that while the system described below may be used for delivering either or both of the pad fluid and/or IMA treatment fluid, each treatment fluid is delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the micro-sized proppant particulates and/or the micro-sized proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

FIG. 1 shows an illustrative schematic of a system that can deliver the treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

Embodiment A: A method comprising: (a) introducing a first treatment fluid into a low-permeability subterranean formation comprising carbonate material having a first fracture network at a first treatment interval therein, wherein the first treatment fluid comprises a first aqueous base fluid and a chelating etching agent, and wherein the first fracture network comprises a first main fracture and a first microfracture; (b) placing the chelating etching agent in the first fracture network; (c) reacting the chelating etching agent with the carbonate material in the first fracture network, wherein the reacting removes the carbonate material, thereby creating at least one conductive channel on a face of the first fracture network; (d) introducing a second treatment fluid into the low-permeability subterranean formation, the second treatment fluid comprising a second aqueous base fluid and micro-sized proppant particulates; and (e) placing the micro-sized proppant particulates into the first fracture network to form a partial monolayer in the first microfracture.

Embodiment A may have one or more of the following additional elements in any combination:

Element A1: Wherein the first treatment fluid is introduced into the low-permeability subterranean formation at a rate and pressure sufficient to create or enhance the first fracture network.

Element A2: Further comprising repeating steps (a) through (e) at the first fracture network at the first treatment interval, or at a second fracture network at a second treatment interval in the low-permeability subterranean formation.

Element A3: Further comprising repeating steps (a) through (e) at the first fracture network at the first treatment interval, or at a second fracture network at a second treatment interval in the low-permeability subterranean formation, and wherein the first fracture network and the second fracture network are interconnected.

Element A4: Wherein a treatment fluid consisting of the first treatment fluid, the second treatment fluid, and any combination thereof further comprises a surface modification agent.

Element A5: Wherein the chelating etching agent is selected from the group consisting of N-(phosphonomethyl) iminodiacetic acid; a salt of N-(phosphonomethyl)iminodiacetic acid; a phosphonic acid; a salt of a phosphonic acid; and any combination thereof.

Element A6: Wherein the chelating etching agent is present in the first treatment fluid in an amount in the range of from about 0.1 g/L to about 300 g/L of the first aqueous base fluid.

Element A7: Wherein the micro-sized proppant particulates have an average particle size distribution of from about 0.1 μm to about 150 μm.

Element A8: Wherein the micro-sized proppant particulates are present in the second treatment fluid in an amount of from about 1.2 g/L to about 60 g/L of the second aqueous base fluid.

Element A9: further comprising: (f) introducing a third treatment fluid into the low-permeability subterranean formation, the third treatment fluid comprising a third aqueous base fluid and macro-sized proppant particulates having an average particle size distribution of from about 160 μm to about 1000 μm; and (g) placing the macro-sized proppant particulates into the first fracture network to form a proppant pack in the first main fracture.

Element A10: Further comprising introducing a pad fluid into the low-permeability subterranean formation prior to step (a) at a rate and pressure sufficient to create or enhance the first fracture network, wherein the pad fluid comprises a third aqueous base fluid and a surface modification agent; coating a face of the first fracture network with the surface modification agent; and adhering at least a portion of the chelating etching agent to the surface modification agent coated on the face of the first fracture network and/or adhering at least a portion of the micro-sized proppant particulates to the surface modification agent coated on the face of the first fracture network.

Element A11: Further comprising a tubular extending into the low-permeability subterranean formation, and a pump fluidly coupled to the tubular, wherein a treatment fluid selected from the group consisting of the first treatment fluid, the second treatment fluid, and any combination thereof is introduced into the low-permeability subterranean formation through the tubular.

By way of non-limiting example, exemplary combinations applicable to A include: A with A1, A4, A6, and A11; A with A9 and A10; A with A1, A2, A3, A4, A5, A6, A7, A8, A9, A10, and A11; A with A2, A5, A6, and A8; A with A1, A3, A5, A6, A8, A10, and A11; A with A4, A5, A7, and A10; and the like.

Embodiment B: A method comprising: (a) introducing a first treatment fluid into a low-permeability subterranean formation comprising carbonate material having a first fracture network at a first treatment interval therein, wherein the first treatment fluid comprises a first aqueous base fluid, a chelating etching agent, and micro-sized proppant particulates, and wherein the first fracture network comprises a first main fracture and a first microfracture; (b) placing the chelating etching agent in the first fracture network; (c) reacting the chelating etching agent with the carbonate material in the first fracture network, wherein the reacting removes the carbonate material, thereby creating at least one conductive channel on a face of the first fracture network; and (d) placing the micro-sized proppant particulates into the first fracture network to form a partial monolayer in the first microfracture.

Embodiment B may have one or more of the following additional elements in any combination:

Element B1: Wherein the first treatment fluid is introduced into the low-permeability subterranean formation at a rate and pressure sufficient to create or enhance the first fracture network.

Element B2: Further comprising repeating steps (a) through (d) at the first fracture network at the first treatment interval, or at a second fracture network at a second treatment interval in the low-permeability subterranean formation.

Element B3: Further comprising repeating steps (a) through (d) at the first fracture network at the first treatment interval, or at a second fracture network at a second treatment interval in the low-permeability subterranean formation, and wherein the first fracture network and the second fracture network are interconnected.

Element B4: Wherein the first treatment fluid further comprises a surface modification agent.

Element B5: Wherein the chelating etching agent is selected from the group consisting of N-(phosphonomethyl)

iminodiacetic acid; a salt of N-(phosphonomethyl)iminodiacetic acid; a phosphonic acid; a salt of a phosphonic acid; and any combination thereof.

Element B6: Wherein the chelating etching agent is present in the first treatment fluid in an amount in the range of from about 0.1 g/L to about 300 g/L of the first aqueous base fluid.

Element B7: Wherein the micro-sized proppant particulates have an average particle size distribution of from about 0.1 μm to about 150 μm.

Element B8: Wherein the micro-sized proppant particulates are present in the first treatment fluid in an amount of from about 1.2 g/L to about 60 g/L of the first aqueous base fluid.

Element B9: Further comprising: (e) introducing a second treatment fluid into the low-permeability subterranean formation, the third treatment fluid comprising a second aqueous base fluid and macro-sized proppant particulates having an average particle size distribution of from about 160 μm to about 1000 μm; and (f) placing the macro-sized proppant particulates into the first fracture network to form a proppant pack in the first main fracture.

Element B10: Further comprising introducing a pad fluid into the low-permeability subterranean formation prior to step (a) at a rate and pressure sufficient to create or enhance the first fracture network, wherein the pad fluid comprises a second aqueous base fluid and a surface modification agent; coating a face of the first fracture network with the surface modification agent; and adhering at least a portion of the chelating etching agent to the surface modification agent coated on the face of the first fracture network and/or adhering at least a portion of the micro-sized proppant particulates to the surface modification agent coated on the face of the first fracture network.

Element B11: Wherein the first treatment fluid further comprises a foaming agent, and further comprising: introducing a pad fluid into the low-permeability subterranean formation prior to step (a) at a rate and pressure sufficient to create or enhance the first fracture network, wherein the pad fluid comprises a second aqueous base fluid and a gas; and foaming the pad fluid during step (a) by introducing the first treatment fluid into the low-permeability subterranean formation and reacting the foaming agent and the gas.

Element B12: Wherein the first treatment fluid further comprises a surface modification agent, and further comprising: coating a face of the first fracture network with the surface modification agent; and adhering at least a portion of the chelating etching agent to the surface modification agent coated on the face of the first fracture network and/or adhering at least a portion of the micro-sized proppant particulates to the surface modification agent coated on the face of the first fracture network.

Element B13: Further comprising a tubular extending into the low-permeability subterranean formation, and a pump fluidly coupled to the tubular, wherein the first treatment fluid is introduced into the low-permeability subterranean formation through the tubular.

By way of non-limiting example, exemplary combinations applicable to B include: B with B1, B2, B5, B7, and B11; B with B4, B6, and B12; B with B11, B12, and B13; B with B1, B2, B3, B4, B5, B6, B7, B8, B9, B10, B11, B12, and B13; B with B3, B5, B9, and B10; and the like.

To facilitate a better understanding of the embodiments of the present disclosure, the following examples of preferred or representative embodiments are given. In no way should the following examples be read to limit, or to define, the scope of the embodiments described herein.

EXAMPLE 1

In this example, a treatment fluid comprising a chelating etching agent was evaluated for increasing the conductivity of a fracture simulated by using an outcrop Eagle Ford shale core split into two halves. The treatment fluid (TF1) was prepared by diluting 2% volume per volume (v/v) CLA-WEB® mineral fines stabilizer, 0.25% v/v SANDWEDGE® ABC surface modification agent, and 0.005 ppg N-(phosphonomethyl)iminodiacetic acid (PMIDA) chelating etching agent in fresh water.

The two halves of the shale formation core sample was immersed in TF1 in a beaker while the fluid was being stirred for 10 minutes (min) at 60° C. (140° F.), which simulates exposure of fracture faces to a treatment fluid according to one or more embodiments described herein. The shale sample was removed and observed using a scanning electron microscope (SEM). The shale formation core samples were observed as having increased conductive channels or wormholes within the samples, due to the solubilization of the carbonate material therein.

EXAMPLE 2

In this example, a treatment fluid a chelating etching agent was evaluated for increasing the conductivity of a fracture simulated by using an outcrop Eagle Ford shale core split into two halves, after treating the core with a mineral fines stabilizer. First, each half of the spit core was immersed in 2% v/v CLA-WEB® mineral fines stabilizer in tap water. They were then carefully matched, put back together, and installed in a Hassler sleeve to determine initial permeability in millidarcies (mD) of the split core. The confining pressure on the core was gradually increased to 1,200 psi and the backpressure was set to 200 psi. Initial permeability measurements were determined with nitrogen gas at three different flow rates and their corresponding differential pressures by starting from the low flow rate.

The core was then disassembled and the split faces of the two halves were immersed vertically in TF1 (described in Example 1) for 10 min while the fluid was being stirred. After the immersion period, the treated halves were reassembled with their faces aligned together for and tested as described above for final permeability measurements. Table 1 shows the initial permeability measurements, the final permeability measurements, and the percent improvement of the split shale core after being treated with TF1. As shown, the permeability was greatly enhanced.

TABLE 1

| $N_2$ Pressure (psi) | Initial Perm (mD) | Final Perm (mD) | % Improvement |
|---|---|---|---|
| 500 | 2.35 | 7.50 | 319 |
| 600 | 1.97 | 6.12 | 312 |
| 700 | 1.85 | 5.25 | 283 |

EXAMPLE 3

In this example, a treatment fluid comprising both a chelating etching agent and micro-sized proppant particulates was evaluated for increasing the conductivity of a fracture simulated by using an outcrop Eagle Ford shale core split into two halves. The treatment fluid (TF2) was prepared by diluting 2% v/v CLA-WEB® mineral fines stabilizer, 0.25% v/v SANDWEDGE® ABC surface modification agent, 0.005 ppg N-(phosphonomethyl)iminodiacetic acid (PMIDA) chelating etching agent, and 0.1 ppg ceramic microspheres micro-sized proppant in fresh water.

As described above with reference to Example 2, the initial permeability was first determined for the split core. The split core was then disassembled and the split faces of the two halves were immersed vertically in TF2 for 10 min while the fluid was being stirred. After the immersion period, the treated halves were reassembled with their faces aligned together and tested as described in Example 2 for final permeability measurements. Table 2 shows the initial permeability measurements, the final permeability measurements, and the percent improvement of the split shale core after being treated with TF1. As shown, the permeability was greatly enhanced, even compared to the results seen in Example 2.

TABLE 2

| $N_2$ Pressure (psi) | Initial Perm (mD) | Final Perm (mD) | % Difference |
|---|---|---|---|
| 500 | 3.48 | 18.15 | 522 |
| 600 | 1.79 | 11.81 | 660 |
| 700 | 1.71 | 8.51 | 497 |

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   (a) introducing a first treatment fluid into a low-permeability subterranean formation comprising carbonate material having a first fracture network at a first treatment interval therein,
   wherein the first treatment fluid comprises a first aqueous base fluid, a chelating etching agent and a surface modification agent wherein the surface modification agent is capable of adhering at least a portion of the chelating etching agent to the surface modification agent coated on the face of the first fracture network,
   wherein the chelating etching agent comprises N-(phosphonomethyl)iminodiacetic acid or a salt of N-(phosphonomethyl)iminodiacetic acid, and
   wherein the first fracture network comprises a first main fracture and a first microfracture;
   (b) placing the chelating etching agent in the first fracture network;
   (c) reacting the chelating etching agent with the carbonate material in the first fracture network, wherein the reacting removes the carbonate material, thereby creating at least one conductive channel on a face of the first fracture network;
   (d) introducing a second treatment fluid into the low-permeability subterranean formation after the chelating etching agent has reacted with the carbonate material, the second treatment fluid comprising a second aqueous base fluid and micro-sized proppant particulates, wherein the micro-sized proppant particulates have an average particle size distribution of about 0.1 μm to about 50 μm; and
   (e) placing the micro-sized proppant particulates into the first fracture network to form a partial monolayer in the first microfracture after reacting the chelating etching agent with the carbonate material in the first fracture network.

2. The method of claim 1, wherein the first treatment fluid is introduced into the low-permeability subterranean formation at a rate and pressure sufficient to create or enhance the first fracture network.

3. The method of claim 1, further comprising repeating steps (a) through (e) at the first fracture network at the first treatment interval, or at a second fracture network at a second treatment interval in the low-permeability subterranean formation.

4. The method of claim 3, wherein the first fracture network and the second fracture network are interconnected.

5. The method of claim 1, wherein the second treatment fluid further comprises a surface modification agent.

6. The method of claim 1, wherein the chelating etching agent further comprises a phosphonic acid; a salt of a phosphonic acid; or both.

7. The method of claim 1, wherein the chelating etching agent is present in the first treatment fluid in an amount in the range of from about 0.1 g/L to about 300 g/L of the first aqueous base fluid.

8. The method of claim 1, wherein the micro-sized proppant particulates are present in the second treatment fluid in an amount of from about 1.2 g/L to about 60 g/L of the second aqueous base fluid.

9. The method of claim 1, further comprising:
   (f) introducing a third treatment fluid into the low-permeability subterranean formation, the third treatment fluid comprising a third aqueous base fluid and macro-sized proppant particulates having an average particle size distribution of from about 160 μm to about 1000 μm;
   and
   (g) placing the macro-sized proppant particulates into the first fracture network to form a proppant pack in the first main fracture.

10. The method of claim 1, further comprising introducing a pad fluid into the low-permeability subterranean formation prior to step (a) at a rate and pressure sufficient to create or enhance the first fracture network,
 wherein the pad fluid comprises a third aqueous base fluid and a surface modification agent;
 coating a face of the first fracture network with the surface modification agent;
 and adhering at least a portion of the chelating etching agent to the surface modification agent coated on the face of the first fracture network and/or adhering at least a portion of the micro-sized proppant particulates to the surface modification agent coated on the face of the first fracture network.

11. The method of claim 10, wherein the chelating etching agent further comprises a phosphonic acid; a salt of a phosphonic acid; or both.

12. The method of claim 1, further comprising a tubular extending into the low permeability subterranean formation, and a pump fluidly coupled to the tubular,
 wherein a treatment fluid selected from the group consisting of the first treatment fluid, the second treatment fluid, and any combination thereof is introduced into the low permeability subterranean formation through the tubular.

13. The method of claim 1, wherein the first treatment fluid further comprises a foaming agent, and
 further comprising:
 introducing a pad fluid into the low-permeability subterranean formation prior to step (a) at a rate and pressure sufficient to create or enhance the first fracture network, wherein the pad fluid comprises a second aqueous base fluid and a gas; and
 foaming the pad fluid during step (a) by introducing the first treatment fluid into the low-permeability subterranean formation and reacting the foaming agent and the gas.

* * * * *